United States Patent [19]
Blinow

[11] 3,894,294
[45] July 8, 1975

[54] FLAT TORQUE RATE DRIVE SYSTEM

[75] Inventor: Igor Blinow, Millis, Mass.

[73] Assignee: Polaroid Corporation, Cambridge, Mass.

[22] Filed: Apr. 24, 1972

[21] Appl. No.: 246,715

[52] U.S. Cl. .................................. 354/158; 354/152
[51] Int. Cl. .......................................... G03b 19/12
[58] Field of Search ............ 95/42, DIG. 2; 267/85, 267/89, 151; 185/37, 40 R, 40 B, 11, 12; 354/152, 158

[56] References Cited
UNITED STATES PATENTS

| | | | |
|---|---|---|---|
| 523,190 | 7/1894 | Wortman | 185/11 |
| 1,121,108 | 12/1914 | Londick | 185/12 |
| 1,789,608 | 1/1931 | Thomas | 185/40 B |
| 2,146,119 | 2/1939 | Hobbs | 185/11 X |
| 3,113,339 | 12/1963 | Krause | 16/191 X |
| 3,413,658 | 12/1968 | Becker | 267/151 X |
| 3,569,652 | 3/1971 | Hauser | 185/37 X |
| 3,673,935 | 7/1972 | Coughlan | 95/42 X |
| 3,685,416 | 8/1972 | Coughlan | 95/42 |

Primary Examiner—Samuel S. Matthews
Assistant Examiner—E. M. O'Connor
Attorney, Agent, or Firm—John W. Ericson; Michael Bard

[57] ABSTRACT

The subject invention provides reflex photographic apparatus incorporating an operator reflex assembly which is moved during a photographic cycle to convert an optical path from a viewing-focusing mode configuration to an exposure mode configuration. A spring system is utilized to drive the assembly, via a four-bar linkage, from the viewing mode position to an exposure mode position quickly while minimizing elastic rebound at the termination of the movement. A motor is utilized to return the assembly to the viewing mode position following a photographic exposure. The spring system includes a low-rate torsion spring acting in concert with a tension spring connected between a frame member and an eccentric such that the combined torque operative to drive the operator reflex assembly remains nearly constant. Such a so-called "flat-torque" characteristic enables an improved efficiency match with the other components of the operator assembly moving mechanism and further functions to prevent undesired oscillation of the operator assembly upon reaching the exposure mode configuration.

5 Claims, 10 Drawing Figures

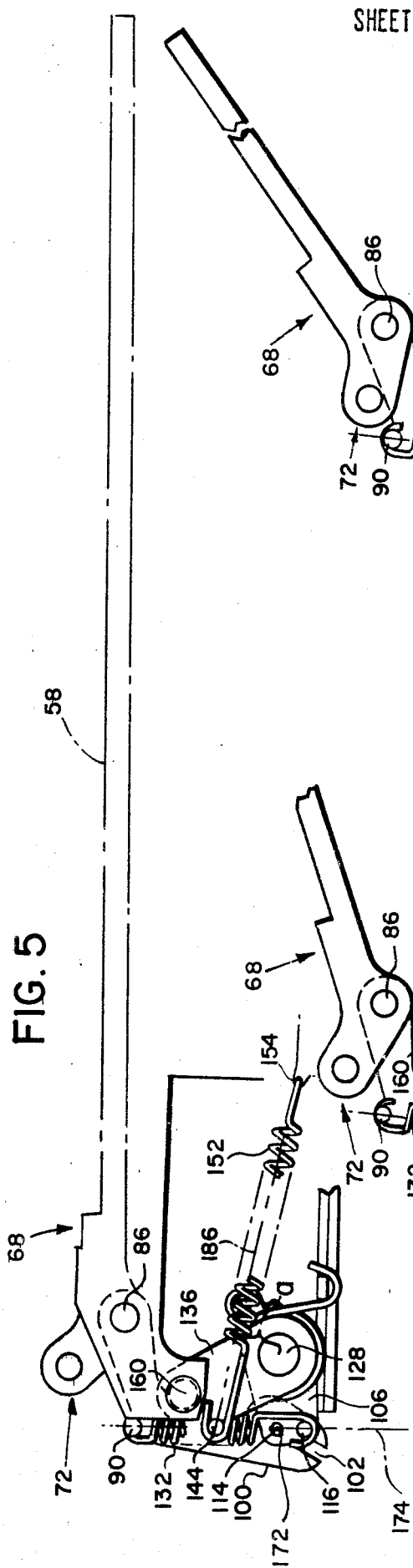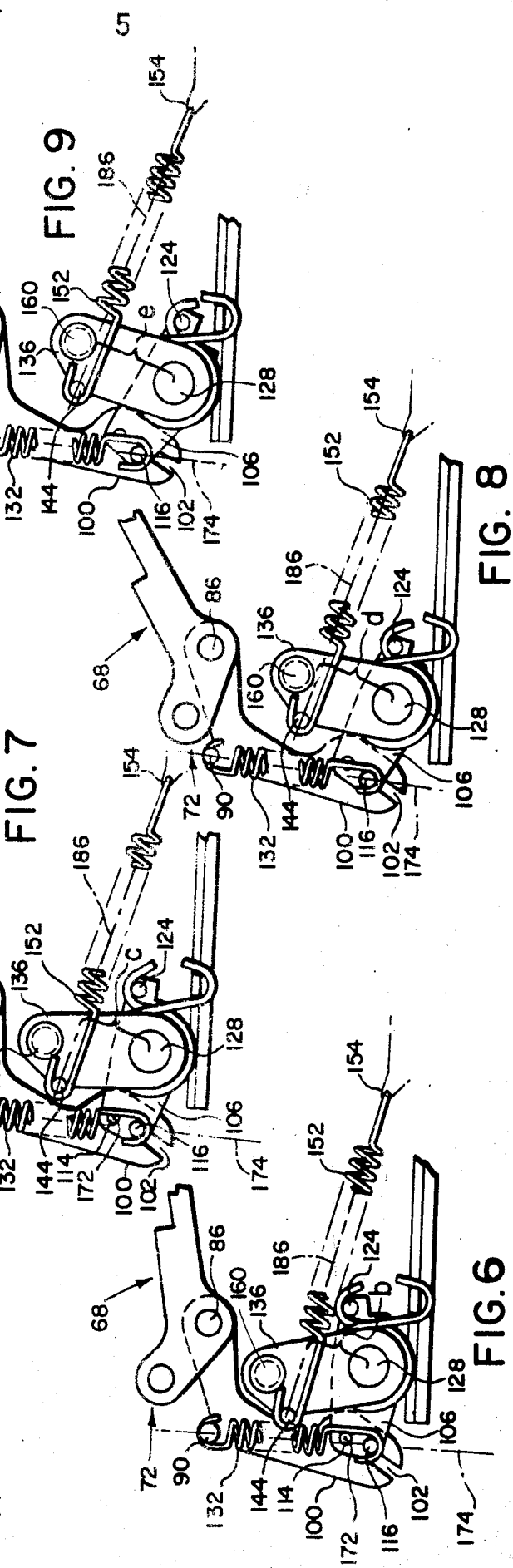

FLAT TORQUE RATE DRIVE SYSTEM

BACKGROUND OF THE INVENTION

The present invention relates generally to self-processing photographic cameras of the reflex type and, more particularly, to a reflex camera in which a specular surface is moved into the optical path of a taking lens when the camera is caused to assume an exposure mode configuration.

Certain photographic film materials are structured to directly record a positive image of any subject properly imaged and exposed thereon. Exemplary of such materials are the film units described in U.S. Pat. No. 3,415,644, entitled "Novel Photographic Products and Processes" and issued to E. H. Land on Dec. 10, 1968. Film units of this type are intended for use within the above-noted self-processing photographic cameras and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the units.

To image properly through a lens system upon the above-described film units, it is necessary that one or an odd number of specular surfaces be incorporated within the optical path extending from the camera lens to the exposure plane of the film unit. Although the film units are configured to provide a desirably large film format, certain improved photographic camera designs have taken advantage of the requisite specular surface to achieve somewhat compact overall camera structures.

Improved photographic cameras as above described are intended to perform in fully automated fashion while being structured so thinly and compactly as to be carried conveniently in the pocket of a garment.

Typically, these improved cameras incorporate an optimum viewing and focusing system together with fully automatic exposure control and motorized automatic film processing. In effect, the fully automatic camera represents an instrumentality incorporating a complex, multi-step process control system.

For purposes providing optimum viewing performance as well as structural compactness, the automated camera preferably utilizes a form of single lens reflex viewing. As described and claimed in a copending application for Letters Patent by E. H. Land, entitled "Reflex Camera," now U.S. Pat. No. 3,672,281, issued June 27, 1972, and commonly assigned herewith, such reflex cameras normally assume a viewing-focusing mode configuration in which their exposure plane is isolated from scene illumination by a flat, movable operator or mirror and viewing surface assembly. In a viewing configuration, the operator assembly serves a function of providing a surface upon which a scene, in reflex fashion, may be framed and focused in preparation for the photographic exposure. In accordance with a modified single lens optical operation, depression of a start button on a camera commences a multi-step control causing its components to assume an orientation securing an exposure chamber by closing its shutter through an electromagnetic drive system. When this chamber is secured, the camera is caused to commence an exposure mode operation in which the earlier-described operator assembly is released for movement via a spring drive to uncover the exposure plane and provide a revised reflex optical path for subsequent exposure of the previously imaged scene.

As an exposure mode configuration is achieved, the automatic exposure control sub-system of the camera cycles through a regulated exposure interval following which the shutter again closes to secure the exposure chamber. The control system of the camera is then called upon to block the operator assembly by driving it via an electrical motor into its viewing mode configuration. Prior to termination of the photographic cycle, an exposed photosensitive film unit is automatically removed from its position at the exposure plane and drawn through a motor-driven processing station. When the operator assembly has been cocked and returned to its orientation covering the exposure plane, the shutter is again opened to its maximum extent and the camera is ready for its next succeeding photographic cycle.

As mentioned previously, the operator assembly is cocked by driving it via an electrical motor into its viewing mode configuration. As a consequence, the operator assembly drive system will usually require an override form of drive linkage to assure proper seating at its cocked position. Such override feature is extremely difficult to incorporate into the confined housings of compact cameras without resorting to the use of relatively high-torque rate drive springs with their attendant undesirably high loads on the relatively small drive motor.

If the operator assembly encounters any interference during its movement toward its cocked or viewing-focusing mode position, the motor may be overloaded and damaged. Certainly, if the motor is overloaded enough, the power drain upon a power supply such as a battery may render it incapable of carrying out other functions during a given photographic cycle.

In dealing with some of the foregoing problems, certain prior art photographic cameras such as described in copending application, Ser. No. 103,219, filed Dec. 31, 1970, now U.S. Pat. No. 3,685,416, to Edward Coughlin and commonly assigned herewith, incorporate a lost-motion connection within the drive system for moving the operator assembly between the exposure mode position and the viewing mode position. Movement of the operator assembly between these positions is accomplished through a system incorporating a four-bar linkage and a drive spring. The system is configured to minimize the time required for moving the operator assembly to its exposure mode position while also minimizing the elastic rebound of the operator assembly when it reaches its exposure mode position.

Typically, a torsion spring is employed for moving the operator assembly to its exposure mode position. The torsion spring is prewound to minimize the operator assembly movement time and also reduce its elastic rebound upon reaching the exposure mode position. This is achieved by maximizing the residual torque of the drive spring at the exposure mode positon of the operator assembly.

A prewound override torsion spring is provided within the drive system and is configured to serve a dual purpose. The override spring functions to insure that the operator assembly is fully seated in its viewing position by allowing the motor to remain energized for a select interval following the seating of the assembly. The override spring absorbs the resultant over-travel motion and biases the assembly into its viewing mode position. This permits more easily achieved manufacturing tolerances in the assembly return mechanism since the components thereof do not have to cooperate to move the operator assembly the precise distance between the exposure mode position and the viewing mode position.

Additionally, the override spring serves to provide an override or lost-motion connection between the motor and the operator assembly. If the operator assembly encounters any interference during its motor-driven movement between the exposure and viewing mode positions, the override spring will allow the motor to finish it normal return cycle. The energy from the motor will be transferred to and stored in the override spring until such time as the interference is removed. When the interference is removed, the override spring returns the operator assembly to its viewing position and attendant damage to the motor will be alleviated.

The override torsion spring described hereinabove which is used in the device of Coughlin U.S. Pat. No. 3,685,416, aforesaid, is disposed concentrically within the low-rate torsional drive spring employed for moving the operator assembly to its erected position. Obviously, the entire mechanism is somewhat complicated and difficult of assembly.

Inasmuch as the operator assembly is spring driven from its viewing-focusing mode position to its exposure mode position in a relatively brief period of time, the operator assembly is subject to undesired oscillation or "bounce" upon reaching its exposure mode position. Obviously, rapid movement of the operator assembly from its viewing-focusing mode position to its exposure mode position is necessary to assure that an acceptably small time interval takes place between the activation of the start button by the operator until the commencement of the exposure of the film unit. Further, unless the "bounce" of the operator assembly upon reaching the exposure mode position can be ameliorated, it is necessary to provide an undesired delay interval between the reaching of the exposure mode position by the operator assembly and the commencement of a photographic exposure in order to provide sufficient time for the operator assembly to cease its undesired oscillation. Undesired oscillation of the operator assembly such as described hereinabove will result in altering the optical path from the taking lens to the film plane so as to cause the image to be out of focus resulting in an unacceptable photographic exposure.

It will be recalled that a prewound torsion spring is utilized to erect the operator assembly in the prior art photographic cameras such as described in Coughlin U.S. Pat. No. 3,685,416, supra. It is characteristic of a torsion spring that the torque delivered thereby decreases from its initial value to a lesser magnitude as the torsion spring delivers its energy to the driven member. If the torsion spring is designed to provide a sufficiently large torque when the driven member reaches its desired position, it may function to secure the driven member (in this case the operator assembly) in such desired position in a manner preventing any undesired elastic rebound or "bounce" thereof. Naturally, the higher the initial torque delivered by the torsion spring, the higher will be the remaining torque supplied by such spring when the driven member reaches its desired position. However, if the initial torque of the torsion spring is made too great (as by highly preloading the torsion spring) then the other components of the system for erecting the driven member may be unduly stressed and an attendant loss of efficiency may be engendered, also. One technique for assuring that the torque delivered by the torsion spring does not drop off too quickly when the driven member is moved from its initial position to its desired position is to utilize what is known as a low-rate torsion spring. Such a spring contains many coils and the torque delivered thereby changes relatively slowly as the torsion spring unwinds. Nevertheless, in order to provide an acceptably high torque from the torsion spring to the operator assembly when the operator assembly has reached the exposure mode position, it is necessary to provide a relatively high preload to the torsion spring which, as indicated supra, may have a deleterious effect on the other components of the operator assembly drive system.

SUMMARY OF THE INVENTION

The subject invention includes a camera of the single lens reflex type having a planar wall which fixedly secures a specular member interposed between a lens and a film plane. The invention further includes an operator assembly incorporating a reflex member having opposed reflecting surfaces. One of these reflecting surfaces functions to reflect the image of a subject to the film plane and the other of these reflecting surfaces functions as a reflective viewing screen.

The operator assembly is mounted for pivotal movement between a first position wherein the viewing screen is positioned at a focal plane overlying and proximate the film or exposure plane and a second position wherein the reflecting surface opposite the viewing surface is positioned overlying the fixed specular surface so as to redirect an image toward said film or exposure plane. Thus, in the first position the reflex member functions as a component of the camera's viewing system; and in the second position it functions as part of the exposure system.

Spring drive means are employed for moving the operator assembly from its viewing mode position to its exposure mode position. The spring drive means are operatively connected to the operator assembly via a unique four-bar erecting linkage which functions to apply the proper driving torque to the operator assembly while minimizing any warping of the operator assembly which might otherwise result from direct coupling with the spring drive means. Upon the completion of a photographic exposure, the operator assembly is returned to its viewing mode position via an electric motor which causes energy to be stored by said spring drive means while operator assembly is returning to the viewing mode position.

The four-bar linkage assembly includes a crank member which is fixedly connected to a shaft which, in turn, is rotatably secured to the frame of the camera. The spring drive means utilized for moving the operator assembly between its viewing and exposure mode positions includes a preloaded torsion spring disposed about the shaft with one end connected to said frame and its other end connected to the crank. The spring drive means further includes a preloaded tension spring, one end of which is connected to the frame and the other end of which is connected to a second crank fixedly secured to said shaft. The torsion spring and the tension spring are so disposed that as the driving torque provided by the torsion spring to the four-bar linkage assembly decreases, the torque provided by the tension spring to the four-bar linkage assembly increases, whereby the net torque applied to the four-bar linkage assembly may be maintained generally constant to provide a "flat"-torque characteristic for the spring drive means. Such "flat"-torque characteristic is accomplished by so configuring and connecting the tension spring that the effective moment arm increases at a greater rate than the decrease in the potential energy of the tension spring. Thus, the entire erecting system may be designed for optimum efficiency by taking advantage of the "flat"-torque characteristic of the spring drive means and sufficient residual torque may be provided to prevent undesired "bounce" of the operator assembly upon reaching the viewing mode position.

A pair of preloaded tension springs are provided within the drive system connected between two of the links of the four-bar linkage and function as override springs in a manner more fully described in my copending application, Ser. No. 246,854, filed on even date herewith. These preloaded tension springs further supplement the torque provided by the spring drive means to the operator assembly and aid in eliminating any undesired "bounce" of the operator assembly upon reaching said exposure mode position.

In view of the foregoing, it is an object of the subject invention to provide a photographic camera of the single lens variety and incorporating a reflex member which functions as a component of both the viewing and exposure systems of the camera and wherein operation may be shifted from a viewing mode to an exposure mode and back to said viewing mode while minimizing the interruption of the user's field of view and with a maximization of mechanical efficiency.

Another object of the present invention is to provide a driving mechanism for moving a reflex operator assembly from a first position to a second position whilst preventing undesired oscillation or "bounce" of the operator assembly upon reaching said second position.

Still another object of the instant invention is to provide a relatively "flat"-torque drive system for moving a reflex operator assembly from a first position to a second position.

A further object of this present invention is to provide a reflex photographic apparatus including an operator assembly movable between viewing and exposure mode positions and incorporating spring drive means for moving the operator assembly from the viewing mode position to the exposure mode position, the spring drive means including first spring means providing a decreasing torque to the operator assembly as the operator assembly approaches the exposure mode position, and second spring means providing an increasing torque to the operator assembly as it approaches said exposure mode position.

A still further object of the instant invention resides in the provision of a novel spring and linkage assembly for moving a reflex member between first and second positions while providing a minimum initial torque to the reflex member and a maximum driving torque to the reflex member as it approaches its second position.

DESCRIPTION OF THE DRAWINGS

Other objects and many of the attendant advantages of the instant invention will become better appreciated and said invention will become clearly understood by reference to the following detailed description when considered in conjunction with the accompanying drawings illustrating one embodiment of the subject invention, wherein:

FIG. 5 provides a simplified functional representation of the operator assembly and erecting mechanism of FIG. 2 whilst said operator assembly is in an override position;

FIG. 6 provides a simplified schematic of the components of FIG. 5 when the operator assembly has moved toward the exposure mode position an angular distance of 10°;

FIG. 7 illustrates the relative positions of the components of FIG. 5 when the operator assembly has moved toward said exposure mode position an angular distance of 20°;

FIG. 8 illustrates the relative positions of the components of FIG. 5 when the operator assembly has moved 30° from its initial viewing-focusing mode position toward said exposure mode position;

FIG. 9 provides a simplified representation of the relative positions of the components illustrated in FIG. 5 when the operator assembly has reached the exposure mode position.

Figure 1:
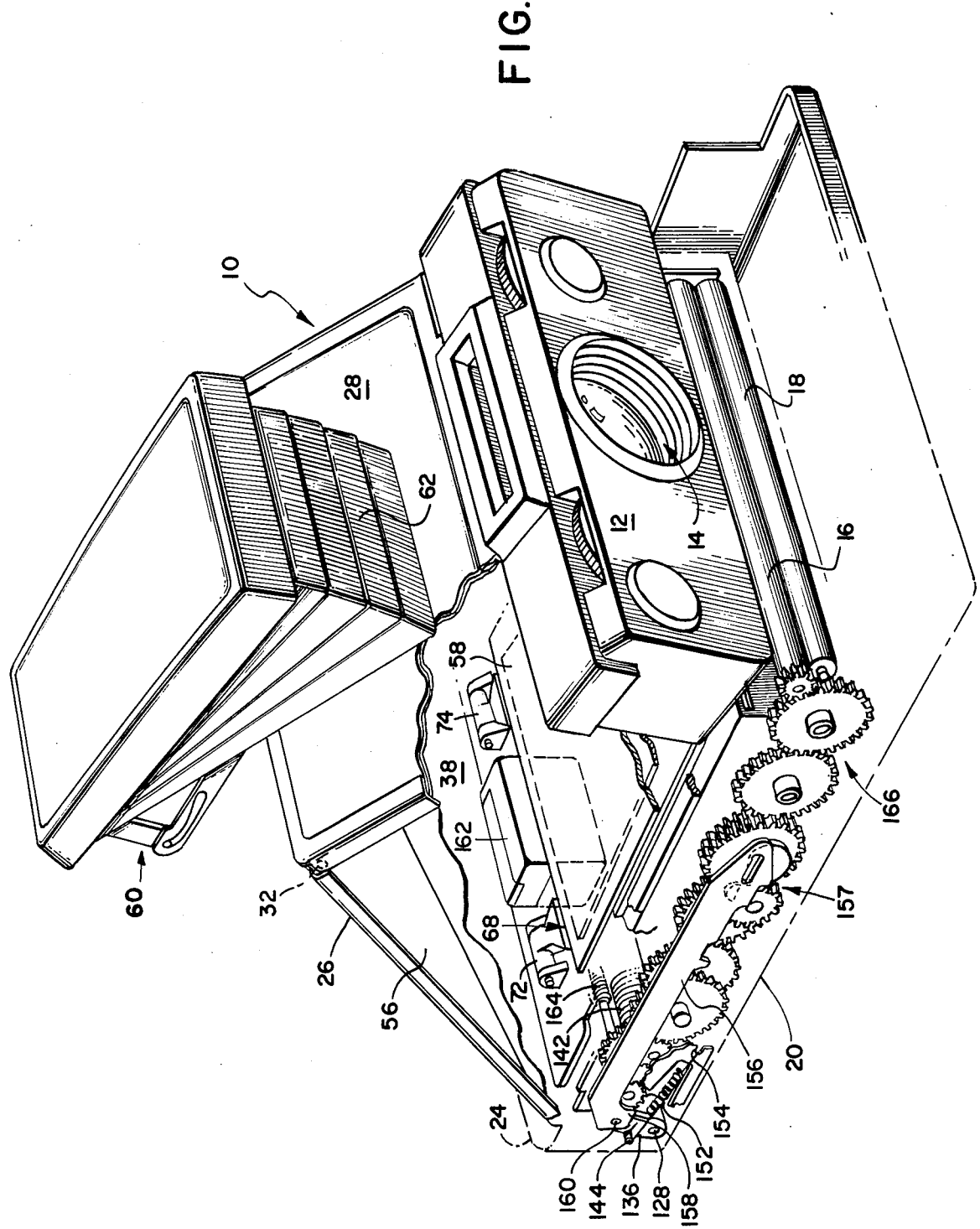
FIG. 1 provides a simplified perspective of a reflex photographic camera incorporating the subject invention.
Figure 2:
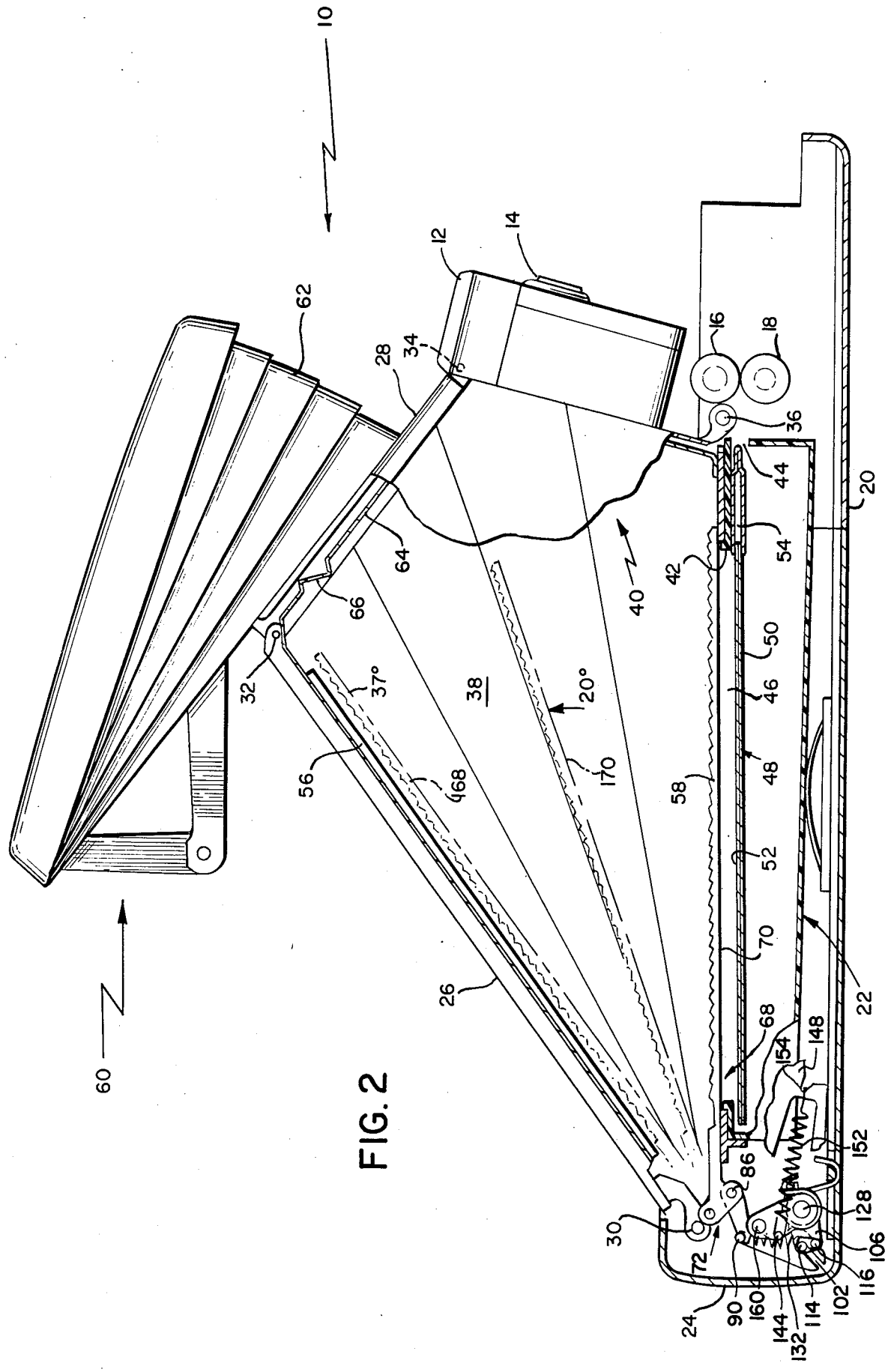
FIG. 2 provides a simplified side elevation of the reflex photographic camera of FIG. 1.

Referring to the drawings in more detail and, more particularly, to FIGS. 1 and 2, a photographic camera of the single lens reflex type is illustrated generally at 10 and is similar to the cameras which are the subject of U.S. Pat. No. 3,672,281, by Edwin H. Land, and commonly assigned herewith. The camera 10 is provided with a forwardly disposed exposure control system housing 12 within which are mounted all of the components required to regulate light passing into the camera. These components include, but are not limited to, an objective lens assembly illustrated generally at 14, a shutter mechanism (not shown), and electronic control circuitry (not shown). A pair of film unit processing rolls 16 and 18 are provided within camera 10 for properly processing an exposed film unit in a now well-known manner.

The photographic camera 10 is further provided with a bottom support portion 20 which serves as a receiving and retaining chamber for a film-laden cassette structure as at 22. The bottom support portion 20 extends to a rear wall portion 24 which extends upwardly to an elongated upper rear portion 26 which, in turn, extends to an elongated upper forward portion 28. The portions 20, 24, 26, and 28, and the housing 12 are pivotally interconnected as at 30, 32, 34, and 36 for movement between the extended position shown and a compact folded position (not shown). The portions 22, 26, and 28, and the housing 12 cooperate with each other in the extended position to define essentially four sides of a generally six-sided exposure chamber 38, the remaining two sides of the chamber 38 being closed by a flexible bellows 40 formed of any suitable opaque material.

The film-laden cassette structure 22, positioned overlying the bottom support portion 20 of the camera 10, is formed as a generally thin parallelepiped having a top open portion, the rectangular periphery of which is defined by an integrally formed ridge 42. The forwardmost facing side of the cassette structure 22 is formed incorporating an opening or slot 44 generally aligned with the line of tangency between the processing rolls 16 and 18.

The cassette structure 22 is removably insertable within a cassettte receiving chamber at the bottom support portion 20 so as to consistently and accurately orient an exposure plane 46 established at the lowermost periphery of the film frame opening defined by the ridge 42. A detailed disclosure of mechanisms for supporting cassettes such as the cassette 22, as at the bottom support portion 20 within the camera 10, is contained in U.S. Pat. application Ser. No. 29,753, filed Feb. 24, 1970, by Edwin H. Land and Alfred H. Bellows, and commonly assigned herewith.

Coincidentally situated at the exposure plane 46 is an uppermost one of a plurality of film units 48 (only one of which is shown). As described in more detail in U.S. Pat. No. 3,415,644, aforesaid, each of the plurality of film units 48 includes all of the materials necessary to produce a positive photographic print. Each of the plurality of film units 48 is physically structured to include a photosensitive element 50 positioned adjacent and in laminar relationship with an image-receiving element 52. The image-receiving element 52 is located upwardly from the element 50 and is urged by spring means (not shown) into the exposure plane 46.

A rupturable container 54 of processing fluid is secured to one end of the laminar assembly of the elements 50 and 52 and is located forwardly within the cassette structure 22. The rupturable container 54 dispenses its processing fluid between the elements 50 and 52 when subject to appropriate compressive pressure by the processing rolls 16 and 18. Each of the plurality of film units 48 is adapted to be processed when advanced, rupturable container 54 foremost, through the slot 44 and between the pressure-applying processing rolls 16 and 18. The latter manipulation causes the rupturable container 54 to dispense its fluid contents between the elements 50 and 52 and to spread the fluid between and in contact with said elements 50 and 52.

The image-forming process is now well known in the art and involves a formation of transverse image-forming substances in the exposed photosensitive element accompanied by their diffusion in a manner forming a visible, positive image.

In the illustrated one of the film units 48, and as described in said U.S. Pat. No. 3,415,644, the processing fluid includes an opacifying agent which is spread as a layer between the photosensitive element 50 and the image-receiving element 52. The opacifying agent is opaque to actinic radiation and provides a background for the photosensitive transfer image evolved in the process.

The components of the camera 10 normally assume a configuration for operating in a focusing or viewing mode. During a photographic cycle, however, these components are reoriented to assume an exposure mode configuration. As best seen in FIG. 2, the components of the camera 10 are illustrated in solid line as they assume a focusing mode configuration. In this configuration, the objective lens assembly 14 focuses light from a subject along an optical path which extends from the objective lens assembly 14 and across the exposure chamber 38 of the camera 10 until it impinges upon and is reflected from a stationary reflex mirror 56.

The stationary reflex mirror 56 is fixedly secured to the elongated upper rear portion 26 of the camera 10 within the exposure chamber 38. The light reaching stationary reflex mirror 56 from the objective lens assembly 14 is reflected from mirror 56 and the optical path courses to a viewing surface indicated generally at 58. The viewing surface 58 is reflective to light and reflects the light impinging thereon back to the upper portion of the stationary reflex mirror 56.

The camera 10 is provided with viewfinder apparatus indicated generally at 60 and which is secured to the elongated upper forward portion 28 of the camera 10 in a well-known manner. The viewfinder apparatus 60 is adapted for movement between folded and extended positions, and includes first and second optical elements (not shown), operatively associable for providing an image of a scene. The optical elements are mounted for movement relative to one another between operative viewing positions and inoperative storage positions. A collapsible shade 62 cooperates with the other components of the viewfinder apparatus 60 to reduce the admission of ambient light between said first and second optical elements when they are located in their respective operative viewing positions. For a more complete understanding and description of the viewfinder apparatus 60, reference may be had to copending application Ser. No. 141,554, filed May 10, 1971, and entitled "Folding Camera".

A baffle plate 64 is secured within the camera 10 in a well-known manner adjacent the exposure chamber 38 and is provided with an aperture 66 which communicates between the exposure chamber 38 and the viewfinder apparatus 60, whereby any light reaching the viewfinder apparatus 60 from the exposure chamber 38 of the camera 10 must pass through said aperture 66.

The aperture 66 is so positioned that the mean optical path courses from the upper portion of the stationary reflex mirror 56 through said aperture 66 into the viewfinder apparatus 60 which, in turn, forms a real, erect, unreverted image of a subject.

With the arrangement above described, the photographic camera 10 may be focused by adjusting the objective lens assembly 14 whilst simultaneously viewing the image on the viewing surface 58 from the viewfinder apparatus 60. With this viewing-focusing mode of operation, the optical path may be considered to have a predetermined length and the objective lens assembly 14 may be considered to establish a focal plane which, when the camera is in a viewing-focusing mode, lies in coincidence with the viewing surface 58. For a more complete understanding of the optics of the viewing system herein described, reference may be had to copending application Ser. No. 98,356, filed Dec. 15, 1970, and entitled "Reflex Camera and Viewing Device", which reveals a somewhat similar system which functions in an analogous manner.

The viewing device 58 is mounted upon, or formed as an integral component of, an operator assembly shown generally at 68 and surface 58 is preferably somewhat smaller than, but with the same shape as, the film format at the exposure plane 46. If the viewing surface 58 has the same shape as the film format, it aids in framing the subject; having the surface 54 slightly smaller than the film format, reduces the chance for accidentally cutting off a portion of the subject by a minor framing error.

Formed of a material opaque to light, the operator assembly 68 is of generally planar configuration and is dimensioned to nest over the cassette structure 22. As a consequence of its configuration, the operator assembly 68 functions to light seal or cap the exposure plane 46 at which the uppermost one of the plurality of film units 48 is situate.

The operator assembly 68 is provided with a specular reflex mirror 70 on its surface opposite the viewing surface 58.

Figure 3:
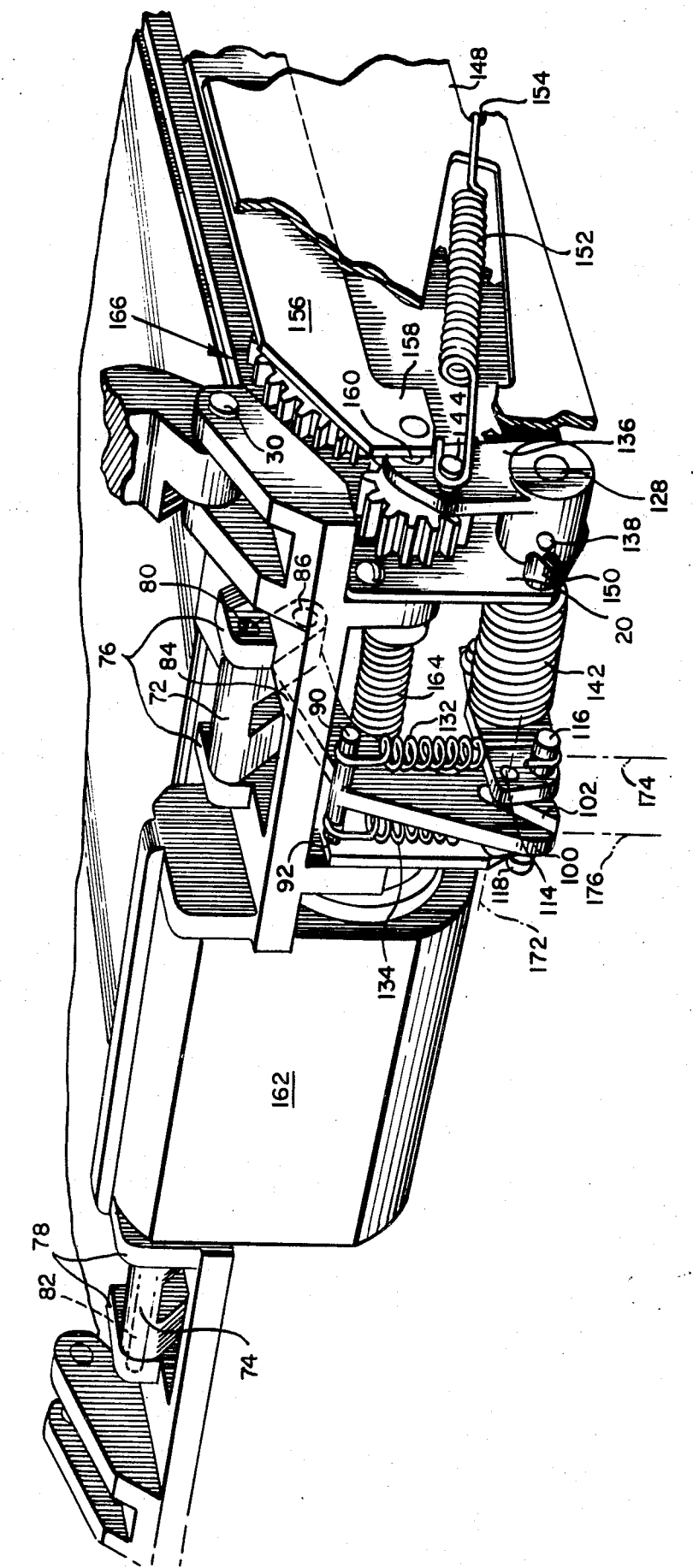
FIG. 3 provides a simplified perspective of a portion of a photographic camera of FIG. 1 illustrating the novel operator assembly erecting mechanism.

As best seen in FIG. 3, one end portion of the operator assembly 68 extends to a pair of spaced parallel hinge portions 72 and 74. A pair of spaced parallel support members 76 and 78 are rigidly secured to the bottom support portion 20 of the camera 10 in a well-known manner and the hinge portions 72 and 74 are pivotally secured to support members 76 and 78, respectively, as by pin means 80 and 82, respectively.

Figure 4:
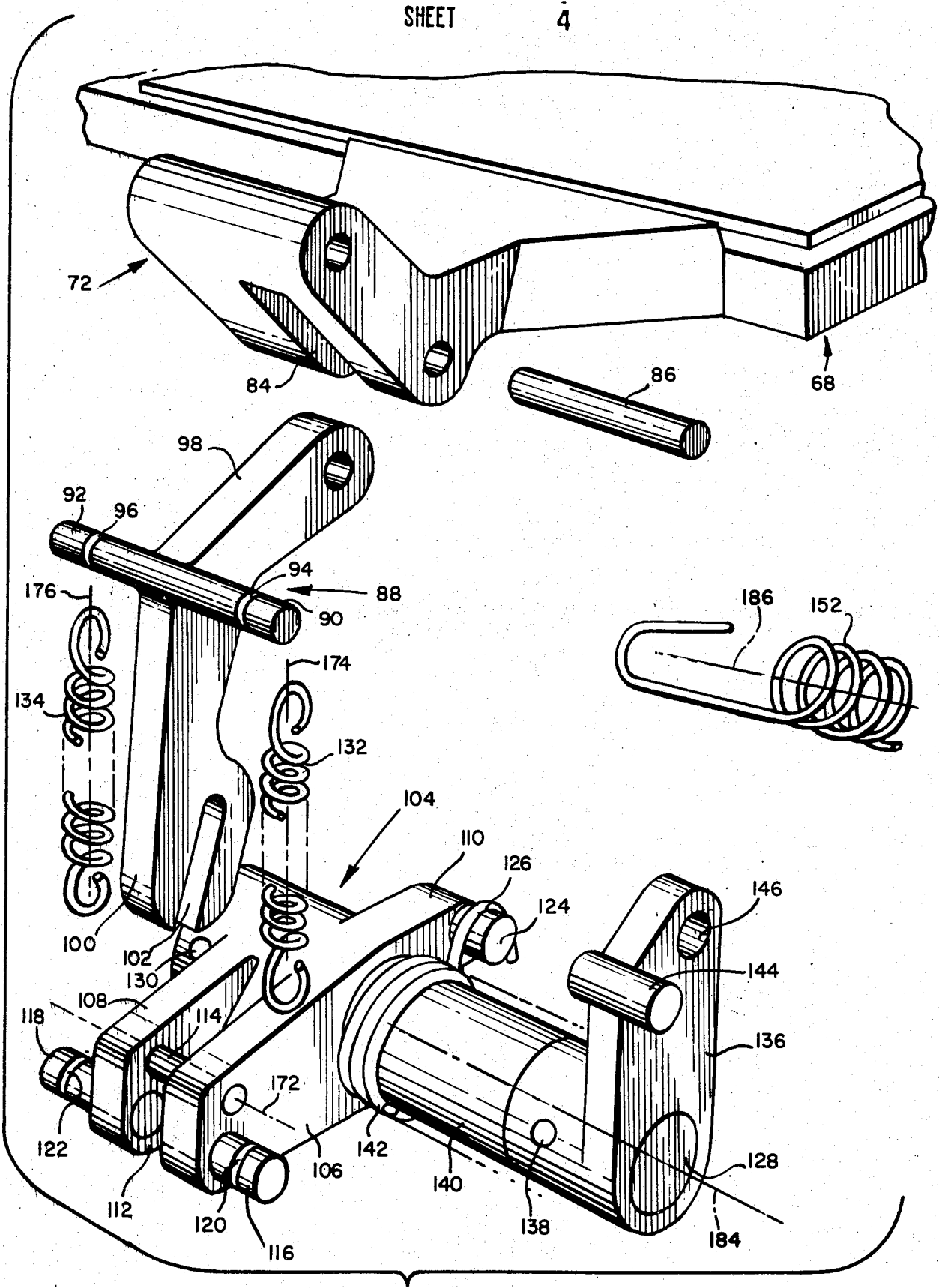
FIG. 4 provides a simplified exploded perspective of the erecting mechanism of FIG. 3.

As best seen in FIGS. 3 and 4, the hinge portion 72 of the operator assembly 68 includes a centrally located slot 84 and is adapted to secure a pin 86 which extends transversely through the slot 84 in spaced parallel relation to the pin means 80. The hinge portion 72 forms one of the elements of a four-bar linkage assembly by which the operator assembly 68 may be driven between its viewing mode and exposure mode positions. A generally "elbow"-shape drawn-down link 88 forms a second element of the four-bar linkage and is provided with a pair of coaxial oppositely directed lugs 90 and 92 which extend transversely thereof and are provided with neck portions 94 and 96, respectively. The link 88 extends to an end portion 98 which is partially received within the slot 84 and pivotally secured to the hinge portion 72 as by pin 86. The draw-down link 88 extends to a bifurcated end portion 100 which defines an open-ended U-shape slot 102.

The third element of the four-bar linkage assembly is provided by a bifurcated crank assembly 104 which extends in one direction to a pair of spaced parallel supports 106 and 108 and in an opposite direction to an end portion 110. The spaced parallel supports 106 and 108 define a slot 112 therebetween, and a pin 114 extends across said slot 112 between the supports 106 and 108. A pair of oppositely directed lugs 116 and 118 extend from the spaced parallel supports 106 and 108, respectively, and are provided with neck portions 120 and 122, respectively. A lug 124 is secured to the end portion 110 of the bifurcated crank assembly 104, extends in a direction parallel to the lug 116, and includes a neck portion 126.

The bifurcated crank assembly 104 is secured to a shaft 128 so as to rotate therewith as by a pin 130, and shaft 128 is rotatably secured to the bottom support portion 20 in a well-known manner. The bifurcated end portion 100 of the drag-down link 88 is slideably received within the slot 112 such that the U-shape slot 102 will slideably receive the pin 114. A pair of tension springs 132 and 134 maintain the "elbow"-shape drag-down link 88 and the bifurcated crank assembly 104 in movable engagement, as will be explained hereinafter.

The tension spring 132 is secured between the lug 90 of the drag-down link 88 and the lug 116 of the bifurcated crank assembly 104 in a well-known manner with one end portion of tension spring 132 disposed within the neck portion 94 and the other end portion of tension spring 132 disposed within the neck portion 120. In like manner, the tension spring 134 is secured between the lug 92 and the lug 118 with one end portion of tension spring 134 disposed within the neck 96 and the opposite end portion of spring 134 disposed within neck 122.

The fourth element of the four-bar linkage assembly is provided by the frame or bottom support portion 20 of said photographic camera 10 and said four-bar linkage assembly functions in a manner to be described in more detail infra.

As best seen in FIGS. 3 and 4, a crank 136 is fixedly secured to one end portion of shaft 128 as by a pin 138. A sleeve 40 is positioned on shaft 128 and is disposed between a portion of support portion 20 and the support 106 of said bifurcated crank assembly 104. A torsion spring 142 is wound about the sleeve 140 with one end portion of spring 142 disposed about the neck portion 126 of the lug 124 and the oppositely directed end portion (not shown) of spring 142 secured to bottom support portion 20 in a well-known manner. The torsion spring 142 is preloaded and, as best seen in FIG. 3, it is so wound as to unwind in a clockwise direction so as to effect clockwise movement of the crank assembly 104 with the shaft 128 (looking into FIG. 3).

The crank 136 is provided with a lug 144 a predetermined radial distance from the axis of rotation of the shaft 128 and is further provided with an opening 146 in its end portion remote from shaft 128. A support plate 148 is secured in spaced parallel relation to a portion of the bottom support portion 20 as by a plurality of spacer bars, one of which is partially illustrated at 150. A preloaded tension spring 152 is connected at one end portion to the support plate 148 as at 154 and at its other end portion to the lug 144 in a well-known manner. A ram 156 forms a component of a kinematic linkage assembly illustrated generally at 157 (FIG. 1) and extends to an end portion 158 having a lug 160 which is pivotally secured to the crank 136 via the opening 146. An electric motor 162 is connected via a spring clutch assembly 164 to a gear train 166, gear train 166 being operatively connected to kinematic linkage assembly and, hence, ram 156. The motor 162 may typically be powered by a battery which may be supplied with the film-laden cassette structure 22 in a well-known manner and functions to drive the crank 136 via the ram 156 of the kinematic linkage assembly 157 and the gear train 166 in a manner more fully described in copending application Ser. No. 134,733, filed Apr. 16, 1971, and entitled "Reflex Camera", and commonly assigned herewith.

Referring again to FIG. 2, the operator assembly 68 is shown in phantom both when in the exposure mode position at 168 and at a position 170 intermediate the exposure mode and viewing mode positions. With the operator assembly 68 in the position 168 and at the completion of an exposure, electrical switches (not shown) within the photographic camera 10 are activated to energize the motor 162. The motor 162 will drive the gear train 166 via the spring clutch assembly 164 which, in turn, will drive the ram 156 via the kinematic linkage 157 toward the rear wall portion 24 of the camera 10 so as to rotate the crank 136 in a counterclockwise direction (looking into FIG. 3). Counterclockwise rotation of the crank 136 will be transmitted through the shaft 128 to the bifurcated crank assembly 104 which, in turn, will wind up the torsion spring 142 by means of the connection between the lug 124 and one end portion of said spring 142, as aforesaid. Such counterclockwise rotation of the crank 136 will also extend the preloaded tension spring 152 so as to increase the energy stored thereby. The tension springs 132 and 134 will cause the drag-down link 88 to move with the bifurcated crank assembly 104 and exert a force on the pin 86 causing the hinge portions 72 and 74 and, hence, the operator assembly 68 to rotate clockwise about the pin means 80 and 82, toward the viewing mode position illustrated in solid line in FIG. 2.

After the operator assembly 68 has assumed the viewing mode position of FIG. 2, capping the film-laden cassette structure 22, the motor 162 will continue running for a predetermined time interval to further store energy in the torsion spring 142 and the tension spring 152. It should be noted at this point that when the operator assembly 68 reaches the viewing mode position of FIG. 1, the pin 114 of the bifurcated crank assembly 104 will be in abutment with the closed end portion of the U-shape slot 102 of the drag-down link 88.

As the motor 162 continues to run for a predetermined interval following the reaching of the viewing mode position by the operator assembly 68, the bifurcated crank assembly 104 will continue its counterclockwise rotation, causing the pin 114 to move along the U-shape slot 102 toward the open end thereof. Such motion of the bifurcated crank assembly 104 will cause the lugs 116 and 118 to move away from the lugs 90 and 92, respectively, so as to stretch the tension springs 132 and 134 and increase the energy stored thereby. The increased loading of the tension springs 132 and 134 will exert a clockwise torque on the operator assembly 68 (about the pins 80 and 82) to insure that the operator assembly 68 is fully seated in the viewing mode position. The positions of the component portions of the four-bar linkage assembly when the operator assembly 68 is in the viewing mode position and the motor 162 has driven the pin 114 toward the open end of the slot 102, may be designated as the "override position" and is illustrated in FIGS. 3 and 5.

When the operator assembly 68 is in the viewing mode position and the components of the four-bar linkage assembly are in the override position, as aforesaid, (FIGS. 3 and 5), the longitudinal axis 172 of the pin 114 lies proximate the plane defined by the longitudinal axes 174 and 176 of the tension springs 132 and 134, respectively.

After the camera 10 is properly focused with respect to the desired subject, a photographic cycle is commenced by depression of a shutter release button (not shown) mounted upon the photographic camera 10. After the shutter release button is depressed, the tension spring 152 and the torsion spring 142 will exert a clockwise torque on the shaft 128, causing the bifurcated crank assembly 104 to rotate clockwise until the pin 114 has seated in the closed end portion of the U-shape slot 102. Further clockwise rotation of the crank 104 will cause the drag-down link 88 to exert a torque on the operator assembly 68 about the pins 80 and 82 via the pin 86. The driving torque exerted on the operator assembly 68 by the drag-down link 88 will be counterclockwise (looking in the direction of FIG. 1) so as to pivot the operator assembly 68 upward to the exposure mode position 168.

Referring to FIGS. 5 – 9 in more detail, it can be seen that when the operator assembly is raised from the override position of FIG. 5 (whereat the operator assembly is generally horizontal) to an angle of 10° with the horizontal, the longitudinal axes 174 and 176 of the tension springs 132 and 134, respectively, will no longer generally lie in a common plane with the longitudinal axis 172 of the pin 114. At this time, the tension springs 132 and 134 will, of course, exert a force on the drag-down link 88 (via the neck portions 94 and 96 of the lugs 90 and 92) along their longitudinal axes 172 and 174. It should also be noted that at this time the longitudinal axis 172 of the pin 114 is serving as the center of pivot for the drag-down link 88 with respect to the crank 104. Inasmuch as the force exerted on the drag-down link 88 by the tension springs 132 and 134 no longer passes through the axis 172 or pivotal center of the drag-down link 88, there will be a net torque exerted on the drag-down link 88 about the pin 114 in a counterclockwise direction (looking into FIG. 5) which will tend to aid the tension spring 152 and the torsion spring 142 in effecting the erection of the operator assembly 68 to the exposure mode position 168 (illustrated in FIG. 2). It should be emphasized at this point that although the tension springs 132 and 134 will effect a supplemental torque in support of that generated by the torsion spring 142 and the tension spring 152, such supplemental torque will be small in comparison to the main driving torque generated by said springs 142 and 152.

FIGS. 7, 8, and 9 illustrate the changes in position of the components of the four-bar linkage assembly as the operator assembly 68 moves successively to a position of 20° with the horizontal (FIG. 7), 30° with the horizontal (FIG. 8), and finally to the exposure mode position (FIG. 9).

It can be seen that when the operator assembly 68 has moved from the position of 10° to the horizontal to 20° with the horizontal, the perpendicular distance from the longitudinal axis 174 of the tension spring 132 to the longitudinal axis 172 of the pin 114 has increased. Similarly, it will be understood that the longitudinal axis 176 of the tension spring 134 (which lies in spaced parallel relation to the longitudinal axis 174) will be positioned at the same perpendicular distance from the axis 172 as the axis 174.

Further, it will be understood that the tension springs 132 and 134 are so designed and preloaded that the energy stored thereby and, hence, the tensile force exerted between the lugs 90 and 92 and the lugs 116 and 118, respectively, will not vary appreciably as the operator assembly 68 moves from the position of FIG. 6 successively to the positions of FIGS. 7, 8, and 9. Thus, when the operator assembly 68 has moved from the 10° position of FIG. 6 to the 20° position of FIG. 7, the counterclockwise torque exerted on the drag-down link 88 about the pin 114 will have increased in proportion to the increase in the perpendicular distance between the axes 174 and 176 and the axis 172. Such increased counterclockwise torque exerted on the drag-down link 88 will exert a counterclockwise torque on the operator assembly 68 about the pins 80 and 82 to effect continued upward movement of the operator assembly 68 toward the elongated upper rear portion 26 of the photographic camera 10. Similarly, the tension springs 132 and 134 will exert a progressively increasing counterclockwise torque tending to erect the operator assembly 68 to the exposure mode position as said operator assembly 68 successively moves from the position of FIG. 7 to that of FIG. 8 and finally to the fully erected position of FIG. 9. Thus, it can be seen that the tension springs 132 and 134 readily supplement the torque provided by the torsion spring 142 and the tension spring 152 in erecting the operator assembly 68 from the viewing mode position to the exposure mode position.

Referring again to FIG. 10, a graphical illustration of the torque delivered by the torsion spring 142 to the operator assembly 68 is shown at 178 while the torque delivered by the tension spring 152 to the shaft 128 is indicated generally at 180. The combined torque delivered by the tension spring 152 and the torsion spring 142 is indicated at 182. Before proceeding, it should be noted that the higher the clockwise torque delivered to the shaft 128 at the time the operator assembly 68 has assumed its exposure mode position 168 (FIG. 2), the less tendency for the operator assembly 68 to oscillate about the pin means 80 and 82 or "bounce" upon reaching said exposure position 168. Also, it is to be noted that the higher the clockwise torque delivered to the shaft 128 when the operator assembly 68 is in the viewing-focusing mode position with the components of the four-bar linkage assembly in the override position, the higher will be the stress on the kinematic linkage assembly 157 and the gear train 166. Obviously, too high a torque delivered to the kinematic linkage assembly 157 and the gear train 166 will cause the rapid wearing thereof, possible breakage, and a degradation in the efficiency of the entire erecting system.

As clearly shown by the curve 178, the torque delivered to the shaft 128 by the torsion spring 142 will decrease fairly linearly as the operator assembly moves from its override position to the erected position of the exposure mode. In contradistinction, however, the graph 180 illustrates that the torque delivered to the shaft 128 by the tension spring 152 will increase as the operator assembly 68 moves toward the exposure mode position from the override position and only begin to fall off slightly as the operator assembly 68 closely approaches the exposure mode position. The increase in the torque delivered to the shaft 128 by the tension spring 152 can best be explained with reference again to FIGS. 5 – 9. In the override position of the erecting mechanism illustrated in FIG. 5, it can be seen that the crank 136 is in its maximum counterclockwise position (looking into FIG. 5) and that, therefore, the distance between the lug 144 and the connection 154 (and, hence, the loading of the tension spring 152) is a maximum. However, the moment arm $a$ between the longitudinal axis 184 of the shaft 128 and the longitudinal axis 186 of the tension spring 152 will be a minimum. Of course, the force vector of the tension spring 152 is directed along the longitudinal axis 186 thereof, and the torque delivered thereby to the shaft 128 is a function of the magnitude of said force vector multiplied by the perpendicular distance between said force vector and the center of rotation of said shaft 128. In the position shown in FIG. 5, the relatively small distance $a$ results in the torque being delivered to the shaft 128 by the tension spring 152 being at a minimum.

Looking now to FIG. 6, it is seen that as the operator assembly has moved to the 10° position, the distance between the lug 144 and the connection 154 has decreased, but the moment arm designated $b$ has now increased an amount proportionally greater than the decrease in the force delivered by said tension spring 152. Consequently, when the operator assembly 68 is in the position illustrated in FIG. 6, the torque delivered to the shaft 128 by the tension spring 152 will be greater than that delivered by said tension spring 152 to said shaft 128 when the erecting assembly is in the override position.

As best seen in FIG. 7, the extension of the tension spring 152 has decreased still further as the operator assembly reaches the 20° position, but the moment arm $c$ has now increased a proportionately greater amount and the torque delivered by said tension spring 152 to said shaft 128 will have increased still further.

Figure 10:
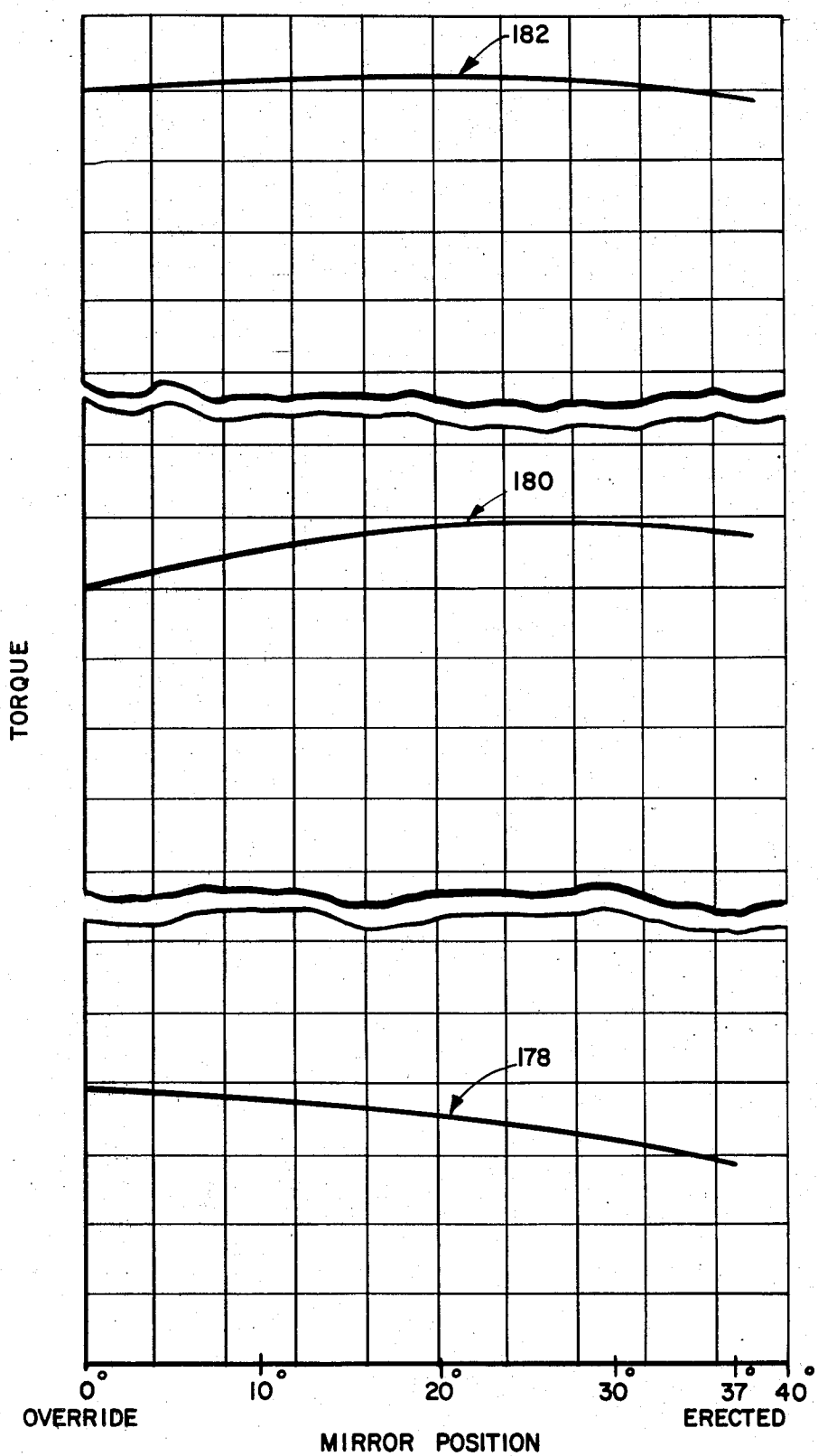
FIG. 10 provides a graphical illustration of the driving torque delivered by said spring drive means as said operator assembly moves from said override position to said exposure mode position.

Looking now to FIG. 8 with the components of the erecting assembly and the operator assembly 68 assuming the 30° position, it is readily appreciated that the extension of the tension spring 152 has again decreased. Note, however, that the moment arm of the force delivered by the tension spring 152 has now increased to the distance $d$, and said distance $d$ is proportionately larger than the distance $c$ an amount greater than the proportional decrease in the extension of the spring 152 from its configuration in FIG. 7. Accordingly, the torque delivered to the shaft 128 by the tension spring 152 will have increased over that delivered when the operator assembly 68 was in the 20° position of FIG. 7. Finally, when the operator assembly 68 has assumed the exposure mode position (FIG. 9), the extension of the tension spring 152 will have decreased from that illustrated in FIG. 8. At this time, however, the moment arm of the force delivered by the tension spring 152 will have increased to the distance $e$. The proportional increase of the distance $e$ over the distance $d$ of FIG. 8 will not be as great as the proportional decrease in the extension of the tension spring 152 from its configuration of FIG. 8. Consequently, the torque delivered by the tension spring 152 to the drive shaft 128 when the operator assembly 68 is in the exposure mode position will have decreased somewhat from the torque delivered by said tension spring 152 in the 30° position of said operator assembly 68. Although the torque delivered to the shaft 128 by the tension spring 152 is somewhat decreased, this decrease (as best seen in FIG. 10) is quite slight and will not significantly effect system performance.

Referring again to FIG. 10, it is seen that the combined torque delivered by the tension spring 152 and the torsion spring 142 to the shaft 128 will be very nearly constant, as indicated at 182. Such constant or "flat" torque delivery is a direct result of closely matching the increasing torque rate of the tension spring 152 with the decreasing torque rate of the torsion spring 142. The "flat" torque illustrated at 182 permits the provision of a maximum residual torque delivered to the shaft 128 when the operator assembly 68 is in the exposure mode position whilst also preventing undue loading of the kinematic linkage assembly 157 and the gear train 166. Thus, the novel spring drive means of the subject invention (including the torsion spring 142 and the tension spring 152) may be designed in consonance with the kinematic linkage assembly 157 and the gear train 166 to achieve maximum efficiency in the entire operator assembly 68 drive system.

With the operator assembly 68 in the exposure mode position 168 (FIG. 2) and after an exposure has been completed, the electric motor 162 operates to drive the gear train 166 (via the spring clutch 164) and the gear train 166 will drive the kinematic linkage assembly 157 and, hence, the ram 156 to effect counterclockwise rotation of the crank 136 and the bifurcated crank assembly 104. Such counterclockwise movement of the bifurcated crank assembly 104 will cause the drag link 88 to pivot the operator assembly 68 clockwise (looking into FIG. 2) about the pins 80 and 82 and toward the viewing mode position.

If, during the travel of the operator assembly 68 toward the viewing mode position such movement were to become inadvertently obstructed, the tension springs 132 and 134 would function as override springs and provide a lost-motion connection between the electric motor 162 and the operator assembly 68 as more fully described in copending application Ser. No. 246,854, aforesaid.

When no obstruction is encountered by the operator assembly 68 as it is being driven toward the viewing mode position by the motor 162, said operator assembly 68 will continue its downward movement towards the viewing mode position. As the motor 162 continues to drive the operator assembly 68 toward the viewing-focusing mode position, it will wind up the torsion spring 142 via the bifurcated crank assembly 104 and extend the tension spring 152 via the increasing distance between the lug 144 and the connection 154 as the crank 136, shaft 128, and bifurcated crank assembly 104 rotate in a counterclockwise direction (looking into FIGS. 5 – 9). After the operator assembly 68 has reached the viewing-focusing mode position, the motor 162 will continue to drive the gear train 166 and the kinematic linkage assembly 157, for a predetermined time interval, to effect further counterclockwise rotation of the crank 136 in the bifurcated crank assembly 104. Such continued movement of said bifurcated crank assembly 104 and crank 136 will wind up the torsion spring 142 until it has stored a predetermined amount of energy in the form of a predetermined initial torque delivery to the shaft 128. Similarly, the tension spring 152 will be extended to a predetermined distance or preloaded so as to deliver a predetermined initial torque to the shaft 128. Thus, at the start of a photographic cycle (with the operator assembly 68 capping the exposure plane 46 and with the erecting assembly in the override position of FIG. 5), a predetermined combined torque will be delivered to the operator assembly 68 by the tension spring 152 and the torsion spring 142 which combined torque will remain nearly constant as the operator assembly moves from its exposure-focusing mode configuration toward its fully erected exposure mode configuration.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. In combination with a reflex photographic camera of the type having operator means movable between a viewing position and an exposure position, apparatus including:
   erecting means coupled with said operator means and actuable to move said operator means between said viewing and said exposure positions;
   drive spring means for providing a rotational output of uniform torque characteristic;
   actuator means driveably engageable with said erecting means and operatively connected to and responsive to said drive spring means for actuating said erecting means to move said operator means from one of said positions to the other of said positions; and
   means connected in driving relationship with said actuator means for effecting return movement of said operator means to one of said positions by said erecting means whilst storing energy in said drive spring means.

2. The invention pursuant to claim 1, wherein said return movement effecting means provides a predetermined amount of energy to said spring drive means whilst said erecting means moves between an initial position and a subsequent position and said operator means remains in said viewing position.

3. The invention as recited in claim 2, wherein said drive spring means includes a torsion spring and an extensible and retractable tension spring.

4. The invention as set forth in claim 3, wherein said torsion spring provides a torque to said actuator means that decreases as said operator assembly moves from said viewing position to said exposure mode position and said tension spring provides a torque to said actuator means that generally increases as said operator assembly moves from said viewing mode position to said exposure mode position.

5. The invention as stated in claim 4, wherein the torque delivered by said tension spring to said actuator means increases as the extension of said tension spring decreases.

* * * * *